United States Patent
Haehner et al.

(10) Patent No.: US 8,499,540 B2
(45) Date of Patent: Aug. 6, 2013

(54) DEVICE FOR DE-ICING THE AIR INTAKE OF A GAS TURBINE

(75) Inventors: Edgar Haehner, Bordes (FR); Eric Royer, Serres Morlaas (FR)

(73) Assignee: Turbomeca, Bordes (FR)

( * ) Notice: Subject to any disclaimer, the term of this patent is extended or adjusted under 35 U.S.C. 154(b) by 992 days.

(21) Appl. No.: 12/532,026

(22) PCT Filed: Mar. 19, 2008

(86) PCT No.: PCT/FR2008/050475
§ 371 (c)(1),
(2), (4) Date: Sep. 18, 2009

(87) PCT Pub. No.: WO2008/132376
PCT Pub. Date: Nov. 6, 2008

(65) Prior Publication Data
US 2010/0101206 A1    Apr. 29, 2010

(30) Foreign Application Priority Data

Mar. 19, 2007  (FR) ...................... 07 53900

(51) Int. Cl.
*F02G 3/00*   (2006.01)
(52) U.S. Cl.
USPC ....................................... 60/39.093
(58) Field of Classification Search
USPC .................. 60/39.093; 244/134 R
See application file for complete search history.

(56) References Cited

U.S. PATENT DOCUMENTS

| | | | |
|---|---|---|---|
| 4,060,212 A | 11/1977 | Magenheim | |
| 4,328,666 A * | 5/1982 | Cummins, Jr. | 60/39.093 |
| 4,831,819 A * | 5/1989 | Norris et al. | 60/39.093 |
| 5,623,821 A | 4/1997 | Bouiller et al. | |
| 6,207,940 B1 | 3/2001 | Feher | |
| 7,874,137 B2 * | 1/2011 | Chaney et al. | 60/39.093 |
| 2002/0182062 A1 | 12/2002 | Scimone | |
| 2003/0052230 A1 | 3/2003 | Feher | |

FOREIGN PATENT DOCUMENTS

| | | |
|---|---|---|
| DE | 2 346 217 | 10/1977 |
| GB | 909928 | 11/1962 |
| GB | 2 292 422 | 2/1996 |

OTHER PUBLICATIONS

Japanese Office Action issued Feb. 28, 2012 in Patent Application No. 2009-554072 with English Translation.
Russian Office Action issued Mar. 12, 2012 in Patent Application No. 2009138335 with English Translation.

* cited by examiner

*Primary Examiner* — Phutthiwat Wongwian
(74) *Attorney, Agent, or Firm* — Oblon, Spivak, McClelland, Maier & Neustadt, L.L.P.

(57) ABSTRACT

A de-icer device for de-icing an air inlet of a gas turbine, such as a helicopter turbine engine. The de-icer device includes an essentially metallic enclosure for admitting air into the engine, the enclosure including a first opening for admitting air into the enclosure, the first opening including a first essentially metallic grid, the enclosure further including a second opening for directing the air towards a compression stage of the gas turbine. The de-icer device further includes a wave generator for generating electromagnetic waves in the enclosure at a frequency suitable for causing ice to melt.

11 Claims, 1 Drawing Sheet

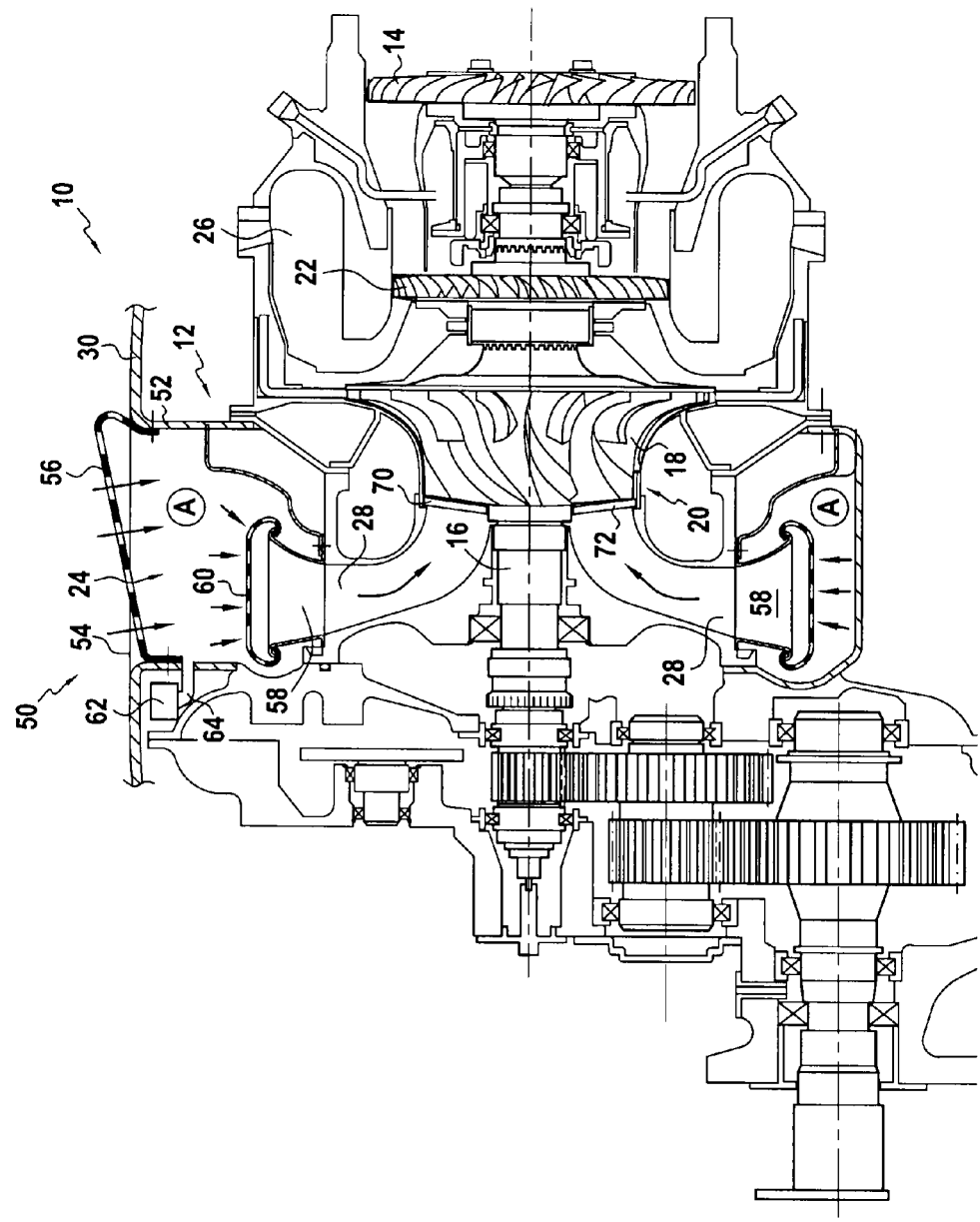

DEVICE FOR DE-ICING THE AIR INTAKE OF A GAS TURBINE

BACKGROUND OF THE INVENTION

1. Field of the invention

The present invention relates to the field of internal combustion engines for aviation and industrial purposes, and particularly but not exclusively to the field of aircraft gas turbines such as the turbine engines that are fitted to helicopters.

More particularly, the invention relates to internal combustion engines such as, for example, gas turbines that include an air inlet and that are to be used under conditions in which ice can form in the air inlet, in particular on a protective grid that is placed in said air inlet and that has the function of preventing foreign bodies from penetrating into the engine.

2. Description of the Related Art

It is well known that under certain meteorological conditions, ice can form in the air inlet of a gas turbine in such quantities that the accumulated ice can cause the air inlet of the gas turbine to become partially obstructed, possibly causing the gas turbine to be damaged totally or in part.

With helicopters, this icing phenomenon may appear in particular when the helicopter is operating in an atmosphere that is cold with humidity that is high, for example over mountains or close to an expanse of water.

It will readily be understood that the existence of a risk of icing constrains the aircraft to remain on the ground in order to avoid any risk of losing power, or of the engine stopping in flight.

The present invention thus relates to a de-icer device for de-icing an air inlet of an internal combustion engine, such as a gas turbine forming part of a helicopter turbine engine, for example.

Amongst already-known de-icer devices, mention can be made of those that use compressed air taken from the outlet of a compression stage of the gas turbine for the purpose of melting the ice.

In such devices, air under pressure is taken from the outlet of the compression stage to the air inlet in order to heat the zones of the engine that need to be de-iced, e.g. stationary members such as the air inlet ducts of the engine or indeed moving members such as the pre-rotation blades that are generally fitted with hinges and that are located immediately upstream from the compressor wheel. A major drawback of such devices is that they consume particularly large amounts of energy since they take off a significant fraction of the energy needed by the thermodynamic cycle of the engine, such as a gas turbine, thereby greatly penalizing the overall efficiency of the engine and the maximum level of power available therefrom. This form of energy take off is also not very effective since the heating operation involves undesirable cooling as a result of the air expanding in the zone concerned.

When the engine is a gas turbine, another drawback is that de-icing is not possible when the gas turbine is idling, since the compression then does not deliver sufficient air at pressure, temperature, and flow rate that enable de-icing to be performed. Under such circumstances, it will thus be understood that the operation of de-icing is poorly effective during approach stages in preparation for landing and during a landing stage itself.

BRIEF SUMMARY OF THE INVENTION

An object of the present invention is to provide a de-icer device that remedies the above-mentioned drawbacks, that consumes little energy and that is capable of being activated even when the turbine is idling or indeed when it is stopped.

The invention achieves this object by the fact that the de-icer device in accordance with the invention comprises an essentially metallic enclosure for admitting air into said engine, said enclosure having a first opening for admitting air into the enclosure, said first opening being provided with a first essentially metallic grid, the enclosure further including a second opening for directing the air towards an inlet of the engine, said device further including wave generator means for generating electromagnetic waves in the enclosure at a frequency suitable for causing ice to melt.

Preferably, the engine is a gas turbine and the engine inlet is constituted by an inlet of a compression stage of the gas turbine.

According to the invention, the waves generated are delivered to the enclosure so as to cause the ice contained in the enclosure or on the first grid to melt by exciting the water molecules constituting the ice, thereby raising the temperature of the ice and thus causing it to melt.

Furthermore, the ice attached to the first essentially metallic grid is also heated by the essentially metallic grid since the temperature of the grid is raised by virtue of the interaction that occurs between the electromagnetic waves and the essentially metallic nature of the first grid.

The term "essentially metallic" is used in the meaning of the invention to specify that the part in question, in particular the enclosure or the first grid, may be made of an insulating material, such as a composite material, but that it has a surface coating that is based on metal.

These parts, i.e. the enclosure and the grid may be made equally well out of a metal material or out of a material that is essentially metallic.

Advantageously, such parts enable the weight of the device to be reduced while improving its performance.

Depending on the material(s) constituting the surface coating, it is possible to define on the walls of the enclosure or on at least the first grid, zones that reflect, zones that absorb, or zones that are partially reflecting and partially absorbent, depending on the effect it is desired to obtain.

The use of a material that is absorbent contributes to creating a wall that is hot as a result of absorbing electromagnetic energy, and conversely the use of a material, such as gold, that reflects electromagnetic energy contributes to creating a wall that is cold.

It is also possible to select a material that enables both waves to be absorbed and currents to be induced. This property of the material presents the specific advantage of raising the temperature of the wall on which ice is liable to form for the purpose of avoiding such formation.

It follows that ice may be melted as a result of the thermal effect due to electromagnetic waves being absorbed by absorbent material and/or by the water molecules of the ice being excited by the electromagnetic waves, these waves being reflected by the reflecting walls and/or being constituted by evanescent waves.

By means of the present invention, it is thus advantageously possible to omit heating the pre-rotation blades, thus making it no longer necessary to provide a specific de-icer device for these blades; this enables the design of the engine to be simplified.

Advantageously, the frequency of the waves is substantially equal to the resonant frequency of a water molecule.

The electromagnetic waves are thus preferably microwaves.

Since the frequency of microwaves is substantially equal to the resonant frequency of a water molecule, the water molecules constituting the ice vibrate and enter into resonance, such that they absorb a large fraction of the energy conveyed by the microwaves, and as a result their temperature rises at least as high as their melting temperature, thereby causing the ice to melt.

By means of the invention, the ice is melted without heating the volume of air passing through the air inlet.

Preferably, the frequency of the waves generated is substantially equal to 2.45 gigahertz (GHz).

This thus achieves a considerable saving in energy compared with the prior art device in which air under pressure heats the stream of air entering into the gas turbine.

In addition, the first essentially metallic grid advantageously forms a de-icing electromagnetic shield, while also filtering the air that penetrates into the air inlet.

Thus, the microwaves serve most advantageously to cause the ice that might form on the first essentially metallic grid to melt.

Thus, the first essentially metallic grid advantageously reflects a fraction of the electromagnetic waves, thereby creating electromagnetic radiation that is confined within the enclosure.

In other words, the ice attached to the surface of the first grid is heated simultaneously by the heat given off by the electric currents that develop at the surfaces of the strands constituting the meshes of the grid, by the wave energy absorbed by the grid in the material of the grid, by the wave energy delivered by the radiation from each strand of the grid, and also by the wave energy emitted by the holes in the grid.

In this embodiment, the space defined between the first grid and an inlet of the engine, preferably an inlet of the compression stage of the gas turbine, constitutes a confinement zone within which microwaves propagate.

Preferably, but not necessarily, the means for generating microwaves further include a wave stirrer. Nevertheless, it is possible to omit such a stirrer, with the function of the wave stirrer then being performed by the moving elements of the compression stage of the gas turbine, which elements act to distribute the electromagnetic waves uniformly within the enclosure. In another advantageous variant, a wave stirrer is omitted in order to concentrate the electromagnetic waves in one or more zones in which it is desired to perform de-icing preferentially.

Advantageously, the means for generating microwaves comprise at least one magnetron, klystron, or any other type of apparatus that enables this function to be performed, the device preferably being connected to the enclosure via a waveguide, the waveguide preferably opening out into the enclosure via a single outlet.

In an advantageous variant, the waveguide presents a circumferential shape so as to distribute the microwaves circumferentially within an enclosure that presents a circumferential shape.

Preferably, one of the ends of the waveguide further includes a plate, preferably a non-magnetic plate, that is permeable to microwaves so as to prevent foreign bodies from traveling along the waveguide to the magnetron and disturbing its operation.

In a particularly advantageous variant, the second opening is provided with a second essentially metallic grid that, preferably, acts as an electromagnetic shield relative to a compression stage of the engine while performing second filtering on the air that penetrates into the engine.

In this variant, the space defined between the first and second essentially metallic grids advantageously forms a confinement zone in which the microwaves can propagate.

Preferably, but not exclusively, the second grid is configured to extend in annular manner around an axis of the compression stage of the engine.

Preferably, the enclosure forms a plenum.

In the meaning of the invention, the term "plenum" should be understood as a housing with outside walls forming a U-shape, said housing having a radial air inlet for placing in annular manner around a shaft of a compression stage.

This is particularly advantageous when the air inlet into the engine is annular, the plenum thus serving to guide the incoming air stream towards the axial inlet of the compression stage.

In this variant, the plenum constitutes a portion of the microwave-confinement zone.

In another variant that is advantageous because it consumes little energy, the enclosure is constituted by first and second grids that are attached to each other via their respective edges, the enclosure then being defined by said grids that meet via their respective edges.

The present invention also provides a helicopter turbine engine provided with an air inlet that includes a de-icer device in accordance with the invention.

Advantageously, the de-icer device of the invention is placed upstream from a compression stage of the turbine engine.

BRIEF DESCRIPTION OF THE DRAWINGS

The invention can be better understood and its advantages appear better on reading the following description of an embodiment given by way of non-limiting example. The description refers to the sole accompanying FIGURE constituting a section view of a helicopter turbine engine with its air inlet provided with a de-icing device in accordance with the present invention.

DETAILED DESCRIPTION OF THE INVENTION

As mentioned above, the present invention can be used in any type of combustion engine, in particular in the gas turbines of aviation turbine engines and industrial turbines.

FIG. 1 is a fragmentary section view of an internal combustion engine constituted by a helicopter turbine engine 10 comprising a gas generator 12 and a free turbine 14.

The gas generator 12 has a shaft 16 having a centrifugal compressor wheel 18 mounted thereon within a compression stage 20, which shaft 16 also carries a turbine wheel 22.

In known manner, the turbine engine has an air inlet 24 through which an incoming stream of fresh air is guided towards the compression stage 20. The compressed air is then sent towards a combustion chamber 26.

The air inlet 24 of the turbine engine has a plurality of ducts 28 into each of which the incoming stream of fresh air penetrates radially prior to being guided so as to enter the compression stage axially.

The turbine engine 10 shown in the FIGURE is provided with a de-icer device 50 in accordance with the present invention that serves to de-ice the air inlet 24 of the turbine engine.

In accordance with the invention, the de-icer device 50 comprises an essentially metallic enclosure 52 for admitting air into the inlet ducts 28 of the turbine engine 10.

Preferably, the enclosure is fastened to a casing 30 of the helicopter.

In this example, the enclosure forms a plenum 52 of axis that coincides substantially with the axis of the shaft 16 of the gas generator 12 and of height that is not less than the axial length of the ducts 28.

The plenum 52 includes a portion that extends radially with an end that forms a first radial opening 54 opening to the outside of the turbine engine 10 through which fresh air enters into the de-icer device 50.

As can be seen in the FIGURE, the first opening 54 is advantageously provided with a first essentially metallic grid 56 serving in particular to filter the air entering into the enclosure 52.

The enclosure 52 also includes a second opening 58 for directing the fresh air towards the compression stage 20 via the ducts 28, this second opening 58 in this example extending in annular manner around the axis of the shaft 16 of the gas generator 12.

In an advantageous variant shown in FIG. 1, the second opening 58 is provided with a second essentially metallic grid 60 that is likewise annular.

As explained below, the de-icer device 50 of the invention is capable of operating in the absence of a second grid 60.

In order to further improve the safety of the turbine engine 10, it is possible to provide for the grids 56 and 60 to present, in an axial section plane, the shape of a mushroom head, thereby enabling air to penetrate via the axial edges of each of the grids in spite of their radial ends becoming obstructed with ice in the event of the wave generator breaking down.

In accordance with the invention, the de-icer device 50 further includes means 62 for generating microwaves in the essentially metallic enclosure 52 and more specifically in the space A defined by the first and second essentially metallic grids.

Said means preferably comprise a magnetron 62 provided with a waveguide 64.

According to the invention, the frequency of the microwaves that are generated is substantially equal to the resonant frequency of a water molecule, i.e. about 2.45 GHz.

Thus, this space A constitutes a confinement zone for the microwaves, i.e. they can be reflected on the edges of the space A.

When the turbine engine 10 is operating under icing conditions, it is found that ice tends to form in the zone A.

To a large extent, it is found that ice forms on the first grid 56, and to a lesser extent on the second grid 60.

According to the present invention, the microwaves generated in the space A excite the water molecules constituting the ice, which molecules then enter into resonance, thereby having the effect of heating them to a temperature higher than their melting point, and as a result the ice melts.

Furthermore, since the first and second grids 56 and 60 are essentially metallic, the microwaves give rise to various interactions of the electromagnetic waves in the meshes of the grids, and in particular to radiation having the consequence of redirecting the waves to the ice. In addition, the interactions of the electromagnetic waves in the meshes of the grids and/or in the material constituting said grids, such as electromagnetic energy being absorbed and/or the appearance of induced currents flowing in the meshes of the grids 56 and 60 have the consequence of raising the temperature of the meshes and consequently of advantageously preventing ice from forming on the first and second grids 56 and 60, or of causing any ice that is attached to said meshes to melt. A major advantage of the invention is that there is no need to heat the entire flow of air passing through the space A, nor even the entire area that is exposed to this flow of air, which would require much more energy than that supplied by the magnetron 62 in the present invention.

A magnetron is a source of energy with a low level of entropy in comparison with using compressed air coming from the outlet of the compressor stage.

Another advantage of the present invention is to make it possible to use grids of meshes that are finer than those in the grids that are used traditionally, thereby enabling the incoming air to be better filtered. In the past it was not possible to provide meshes of small size because of the high risk of the grid becoming obstructed by ice, with such obstruction naturally occurring correspondingly faster with smaller meshes.

Thus, by means of the present invention, it is possible to de-ice the air inlet 24 of the turbine engine 10 even when the engine is stopped or is idling, whereas in the devices of the prior art, de-icing when stopped needs to be performed manually.

Optionally, it is advantageous to use a discharge antenna (not shown) to protect the compression stages from the possible formation of plasma in the event of the de-icer device malfunctioning. Under certain circumstances, a compressor blade may behave like an antenna, with it being possible for an electric field to be created between the base and the tip thereof, thereby ionizing the air and thus generating a plasma that might damage the end of the blade.

In an advantageous variant, a temperature probe for measuring the temperature of the incoming air flow acts as a discharge antenna.

In an advantageous variant, the de-icer device 50 also includes a system for regulating the magnetron 62 so as to servo-control its consumption of electricity as a function of requirements for de-icing.

In another embodiment, the de-icer device of the invention does not have a second essentially metallic grid.

Under such circumstances, the microwave confinement zone is defined between the first essentially metallic grid 56 and the turbine wheel 18 or any other element located in the compression stage 20 and suitable for acting as an electromagnetic shield.

Furthermore, the turbine engine 10 also includes already-known pre-rotation blades 70 and 72, disposed upstream from the compressor wheel 18 at the downstream ends of the ducts 28.

In known manner, these pre-rotation blades serve to orient the incoming air stream into the compressor wheel 18.

According to an advantageous aspect of the invention, the pre-rotation blades and their hinges are made of a material that is essentially permeable to the electromagnetic waves so as to increase the volume and the areas that are subjected to the effect of the microwaves.

The term "essentially permeable" is used in the meaning of the invention to indicate that the part in question, in particular the pre-rotation blades and their hinges may be made of a microwave-permeable material such as a composite, including a reflecting metallic portion such as a surface coating based on metal.

An advantage of the present invention is thus to be able to de-ice the pre-rotation blades without it being necessary to use a specific de-icer device relying on internal ventilation such as those that are usually to be found in certain turbine engines.

By means of the invention, it is thus possible, advantageously, to simplify the design of the compression stage of the turbine engine, while also preventing ice from forming.

The invention claimed is:

1. A de-icer device for de-icing an air inlet of a gas turbine of a helicopter turbine engine, the device comprising:
    an essentially metallic enclosure for admitting air into the gas turbine, the enclosure including
        a first opening for admitting air into the enclosure, the first opening including a first essentially metallic grid, and a second opening for directing the air towards an inlet of the engine; and a wave generator which generates electromagnetic waves in the enclosure at a frequency suitable for causing ice to melt, wherein the second opening includes a second essentially metallic grid, and wherein the first and second grids form a de-icing electromagnetic shield.

2. A de-icer device according to claim 1, wherein the frequency of the waves is substantially equal to the resonant frequency of a water molecule.

3. A de-icer device according to claim 1, wherein the wave generator comprises a magnetron.

4. A de-icer device according to claim 1, further comprising a waveguide connecting the wave generator to the enclosure.

5. A de-icer device according to claim 1, wherein at least one of the enclosure, the first grid, or the second grid is made of a material coated in a layer of an essentially metallic material.

6. A de-icer device according to claim 1, wherein the enclosure forms a plenum.

7. A de-icer device according to claim 1, wherein the enclosure constitutes a confinement zone for the electromagnetic waves.

8. A de-icer device according to claim 1, further comprising at least one discharge antenna.

9. A helicopter turbine engine comprising an air inlet and a de-icer device according to claim 1.

10. A helicopter turbine engine according to claim 9, further comprising pre-rotation blades disposed upstream from the compressor wheel, and wherein the blades are made of a material that is essentially permeable to the electromagnetic waves.

11. A de-icer device according to claim 1, wherein a length of the first grid in an axial section plane is greater than a length of the second grid in the axial section plane.

* * * * *